(12) United States Patent
Cobb

(10) Patent No.: US 7,147,237 B2
(45) Date of Patent: Dec. 12, 2006

(54) BICYCLE FORK

(75) Inventor: John Cobb, Shreveport, LA (US)

(73) Assignee: Morgan Nicol, Montagnola (CH)

( * ) Notice: Subject to any disclaimer, the term of this patent is extended or adjusted under 35 U.S.C. 154(b) by 0 days.

(21) Appl. No.: 10/366,760

(22) Filed: Feb. 14, 2003
(Under 37 CFR 1.47)

(65) Prior Publication Data

US 2004/0026890 A1    Feb. 12, 2004

(51) Int. Cl.
*B62K 17/00* (2006.01)
(52) U.S. Cl. ........................ 280/279; 280/276
(58) Field of Classification Search ................ 280/276, 280/279
See application file for complete search history.

(56) References Cited

U.S. PATENT DOCUMENTS 1,559,277 A * 10/1925 Nelson ........................ 280/279
6,186,529 B1 * 2/2001 Fujii ........................ 280/281.1
6,669,218 B1 * 12/2003 Sinyard et al. ............. 280/274

FOREIGN PATENT DOCUMENTS

TW    436066    5/2001

\* cited by examiner

*Primary Examiner*—Lesley D. Morris
(74) *Attorney, Agent, or Firm*—Greer, Burns & Crain, Ltd.

(57) ABSTRACT

A fork is provided for driving a driving wheel and especially the front wheel of a bicycle. Therefore the steerer is fixed to the axle of a wheel and extends at least partially to the rotation plane of the wheel in a parallel direction. Furthermore the steerer is designed generally as a frame square wherein at least two frame legs are arranged generally parallel and with a certain distance. The frame legs are fixed in a certain position by at least two connecting elements and are designed as profiled sticks. In a preferred embodiment of the contour of the profiled sticks has the shape of an aerofoil.

15 Claims, 5 Drawing Sheets

BICYCLE FORK

BACKGROUND OF THE INVENTION

The invention is related to a bicycle fork for guiding a wheel.

Bicycle forks are known in the art and generally include a control tube, a fork head and two fork tubes.

A reception device is arranged at the lower end of the fork tubes which receives the wheel axles. To correspond to the predetermined mechanical characteristics, these fork tubes are built from metal or light metal alloys.

The cylindrical head tube is guided by a steering tube provided in the frame and supported rotationally at both ends of the steering tube by means of two ball races.

Besides the mechanical characteristics for use in professional bicycle sports, it is especially necessary to also adapt the region of the bicycle forks to aerodynamical requirements, where structures are used which have a reduced flow resistance.

It is the object of the present invention to provide a bicycle fork which has good mechanical strength characteristics and a low flow resistance.

BRIEF SUMMARY OF THE INVENTION

The invention accomplishes this object by providing a fork for guiding a vehicle wheel. Further preferred embodiments of a bicycle fork for guiding a wheel are also provided.

The fork for guiding a vehicle wheel includes at least one fork brace which acts on an axle of the wheel and extends at least partially in one direction which is substantially parallel to the rotational axis of the guided wheel.

The fork brace is formed substantially as a frame quadrangle wherein the frame quadrangle consists of at least two frame legs arranged substantially parallel to each other and connection elements which are spaced with respect to each other.

The frame legs are held in at least two regions by the connection elements in their relative position to each other wherein according to one preferred embodiment of the invention also further connection elements may be provided.

The frame legs themselves are realised at least partially as profile ledges.

Based on the arrangement of the frame legs and the connection regions, a flow channel is defined between the profile ledges, which due to the arrangement of the frame legs extends substantially along the flow direction of the air flowing around the fork brace.

In a specific embodiment, the aforementioned fork brace which essentially is formed as a frame quadrangle is finished by connection regions which on one side comprise the fork head and on the other side the reception device for a wheel axle.

The bicycle fork in a further embodiment is characterized in that the fork brace is arranged in a predetermined angle with respect to a vertical center axis.

Thereby, the fork brace has an angle between 45 degrees and 1 degree, in an preferred embodiment an angle between 30 degrees and 5 degrees, and in a very preferred embodiment an angle between 20 and 7 degrees.

The fork for guiding a vehicle wheel in a very preferred embodiment includes a connection means such as a head tube which extends to the stop element, or the fork head and which is guided by a steering tube provided in the frame and rotationally supported at both ends of the steering tube by means of two ball races (control set).

In a further preferred special embodiment for guiding a rear wheel, the fork especially for a bicycle comprises a fixing device which is connected to the bicycle frame. According to an especially preferred embodiment, the fork may further include braces to keep the rear wheel in a predetermined position.

According to a further embodiment of the present invention, the frame legs used for forming a fork brace are provided as profile ledges which are described by a profile contour. The profile contour may be described at least by the profile depth and the profile thickness at at least one point of the profile depth.

The connection line of two maximally spaced profile contour points is also called a chord, whereby for additionally characterizing the profile contour a so-called skeleton line is also used which follows an axis of the so-called thickness distribution over the profile depth.

The profile depth according to the present invention is understood as a measure for the maximum distance of two contour points and extends substantially along the flow direction of the air flowing around the profile.

The profile thickness of the profile contour follows in dependence upon the profile depth, wherein at least at one point the distance of two profile contour points is described whose connection line is perpendicular to the chord. The profile contour follows as generating a curve of an envelope of the profile contour points, wherein an increasing number of profile contour points lead to a closer description of the profile contour.

According to a specific embodiment of the present invention, the profile contour of the used profile ledges is selected such that the flow resistance with respect to the air flowing around and/or flowing through is low. At the same time, the profile ledges are arranged with respect to each other in such a way that the air flow is directed to a predetermined direction. The profile ledges are arranged such that the air flow is directed away from the wheel arranged between the fork braces.

In a preferred embodiment, the profile ledges are arranged in such a way that the flow courses of the air at the surface regions of the single profile ledges are directed so that the flow courses of the air of the profile ledges arranged essentially parallel to each other do not negatively influence each other. According to the present invention it is intended especially to possibly connect turbulent flow regions or to reduce them.

According to a further preferred embodiment, the fork for guiding the wheel is characterised in that the fork braces, especially the frame legs or the connection regions consist of at least one material or a combination of materials and the material or the materials are selected from a group of materials which contains metals, as e.g. aluminum, titan, synthetic materials, natural materials, fibre glass, carbon, kevlar, fibre glass, composite materials, fibre glass composite materials, polyester, epoxy resin, polymers, natural materials as e.g. wood, latex or the like.

Besides the use of the aforementioned materials or material combinations, the bicycle fork for guiding a bicycle is characterized in that in an especially preferred embodiment the profile ledges of the fork braces are manufactured from structure elements which preferably include the form of honeycomb structures or corresponding microstructures.

According to a further embodiment, the fork for guiding a wheel is characterised in that the profile ledges, fork braces and/or the connection elements are connected with each other by plug connections, bolted connections, adhesive joints, welded joints, soldered joints or similar joining methods and the connection regions are shaped such that the flow resistance is minimised.

In a further preferred embodiment, the connection elements between the profile ledges are characterized in that they extend substantially between the surfaces of the profile ledges and that they are shaped such that the flow resistance for the air flowing around is minimized.

In a very preferred embodiment, the connection elements are made of one piece.

According to a very preferred embodiment, the fork for guiding a wheel is characterised in that the profile ledges and the connection regions are arranged such that predetermined requirements on the mechanical properties of the fork brace are achieved.

These mechanical properties are especially the flexural stiffness and flexural strength, torsional stiffness and torsional strength, flexibility, strain, pressure resistance and breaking strength of the fork brace, of the connection elements and the bicycle fork. Furthermore, the mechanical properties are also achieved by the connection regions, respectively connection methods. It is mentioned, however, that this enumeration does not finally characterise the mechanical properties of the fork brace, but that further reference values of the material necessary for the use of the fork brace are obtained by the shaping of the profile ledges and their arrangement.

With respect to the shape of the profiles, according to a further preferred embodiment, the profile contour is selected such that the flow path of the air differs the length of the flow path on the upper side of a profile from the length of the flow path on the lower side of the profile. A further embodiment provides that the profile contour of the profile ledges arranged substantially parallel to each other, different.

In a further preferred embodiment, the surface structure of the whole bicycle brace is selected such that the flow resistance of the bike fork is minimised. This can be achieved among others by forming the surface of the fork brace such that vortexes occurring on the surface are damped by the surface structure. In a very preferred embodiment, this is achieved by use of a so-called shark-fin structure, grooved structure or notched structure.

A further embodiment of the bicycle fork for guiding a wheel is characterized in that the fork brace is formed substantially as a frame quadrangle and the frame legs and connection regions are connected one piece to each other.

DETAILED DESCRIPTION OF THE INVENTION

The figures show an embodiment for a fork for guiding a vehicle wheel, preferably the front wheel of a bicycle, including at least one fork brace 3a and 3b which acts on an axle of the wheel and at least partially extends in a direction substantially parallel to the rotational axis of the wheel.

The figures especially describe a bicycle fork for a front wheel, however, it is pointed out that the bicycle fork also may be used for a rear wheel, especially for a bicycle.

Figure 1:
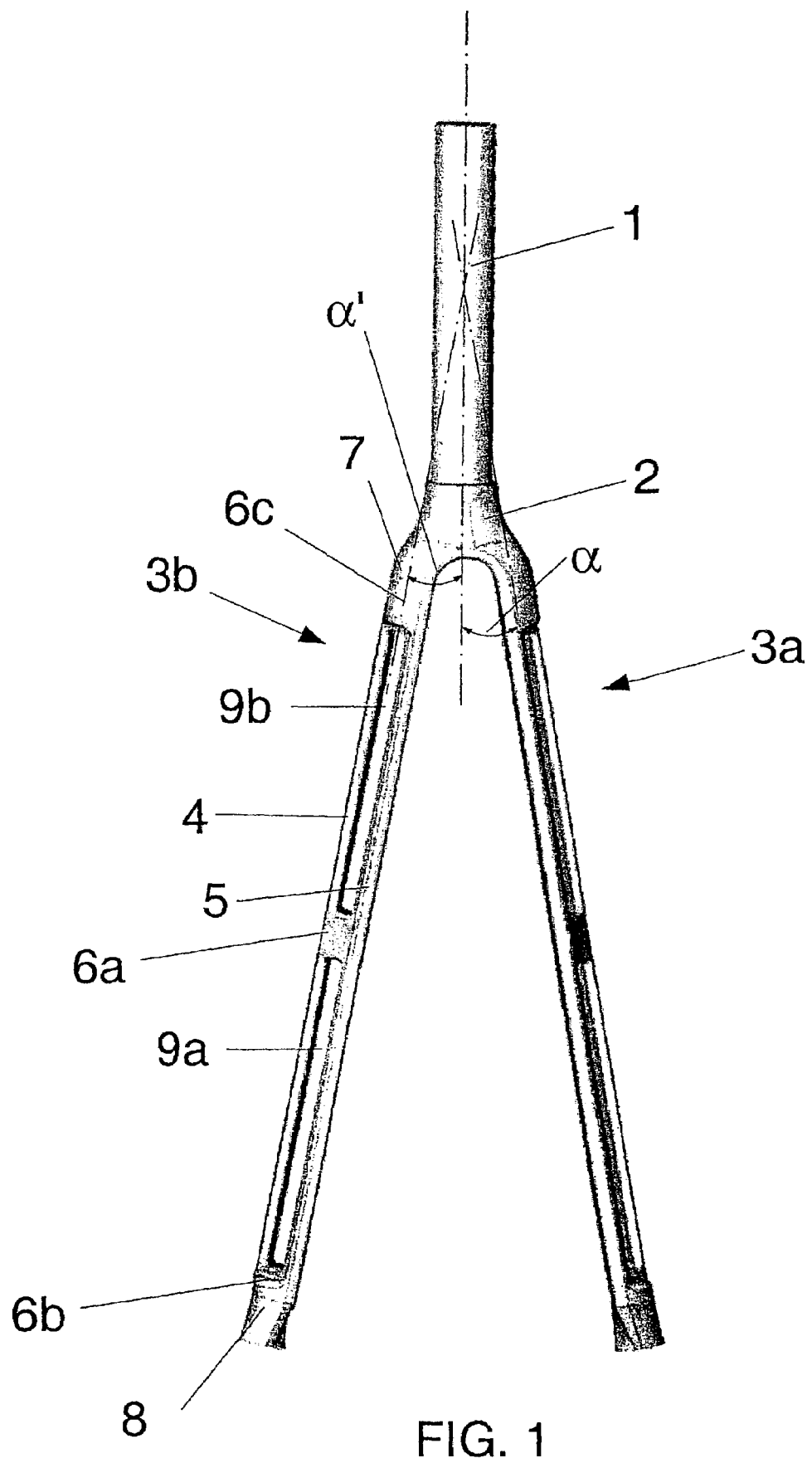
FIG. 1 is a front view of a bicycle fork for guiding a wheel according to the present invention.

FIG. 1 shows a fork for guiding a wheel according to the present invention, wherein the fork tube 1 comprises a fork head 2 and the fork braces 3a and 3b.

The fork braces 3a and 3b are formed substantially as frame quadrangles and include frame legs 4 and 5 connection elements 6a, 6b and 6c. By the arrangement of the frame legs 4 and 5 and the connection regions 6a, 6b and 6c, the fork brace 3b includes flow channels 9a and 9b which extend along a main extension direction of the fork brace and at least during operation are flown through by air. Extending from the connection element 6b, the fork brace includes a final region 8 which includes means for the reception of the bicycle axle.

The connection region 6c finishes the fork brace 3b the upper side and is connected to the fork head 2 via a transition region 7.

The fork braces 3a and 3b are arranged at a predetermined angle α, respectively α', with respect to a vertical center axis. According to the present invention, the predetermined angle α, respectively α', is between 2° and 30°, preferably between 20° and 3° and most preferably between 15° and 5°.

Figure 2:
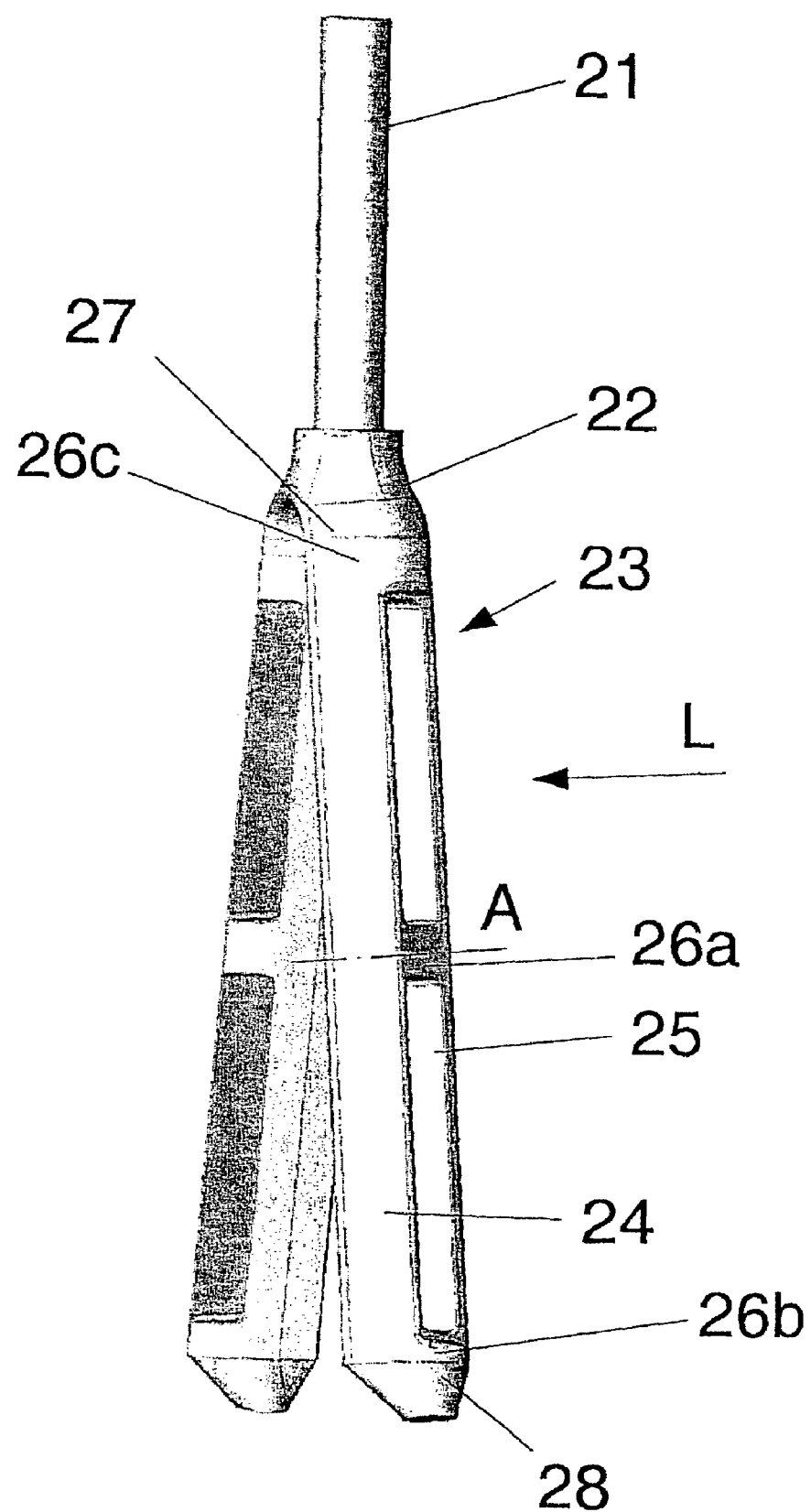
FIG. 2 is a perspective side view of a bicycle fork according to the present invention.

FIG. 2 shows a perspective view of a bicycle fork according to the present invention, wherein the bicycle fork includes a fork tube 21, a fork head 22, wherein the transition region of the fork head to a fork brace 27 includes frame legs 24 and 25 and transition regions 26a, 26b and 26c. Region 28 serves as the end of the fork brace 27 and provides a means for reception of the bicycle axis (not shown).

According to the present invention, the bicycle fork is arranged such that the air flow L hits the bicycle fork from the right side corresponding to the figure and flows around, respectively through the bicycle fork.

Figure 3:
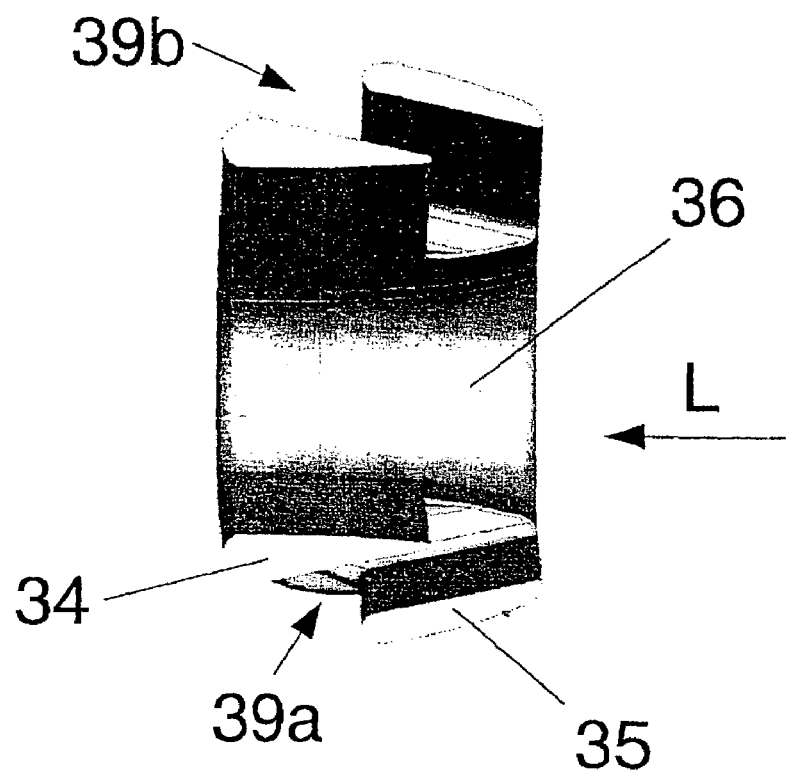
FIG. 3 is a perspective sectional view of a fork brace in the region of a middle connection segment.

FIG. 3 shows a mean perspective sectional view of a fork brace in the region of a middle connection element from FIG. 2.

Beside a connection element 36, the two profile ledges 34 and 35 are shown. Between the profiles, as an extension to the connection region 36, flow channels 39a and 39b are provided through which air flows during operation of the bicycle. The arrow L in FIG. 3 indicates the flow direction of the air occurring in regular operation.

Figure 4:
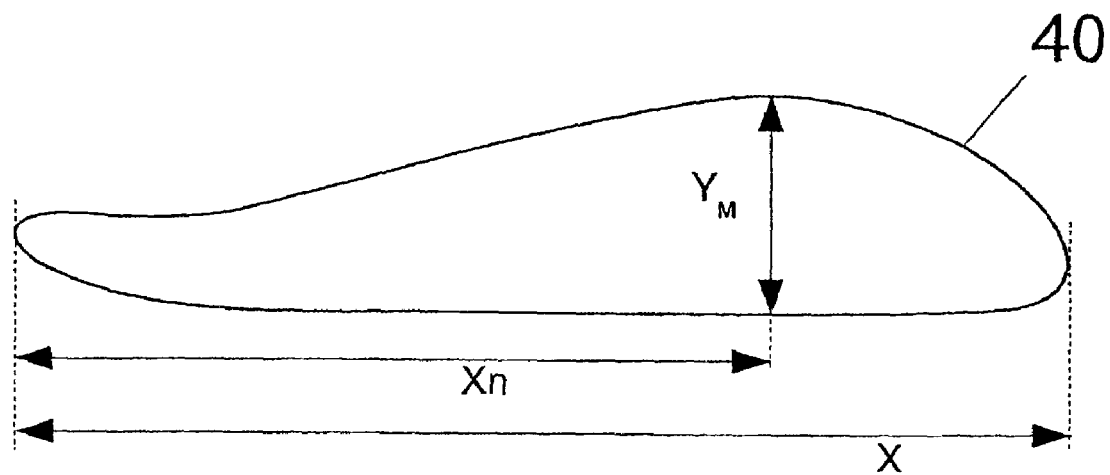
FIG. 4 is a schematic view of a profile contour with scale.

FIG. 4 shows a schematic view of a profile contour with scales, wherein besides the profile depth x, also the profile thickness yn at the position xn of the profile depth is shown. Profile contour 40 follows from the generating curve of an envelope connecting the profile contour points.

Figure 5:
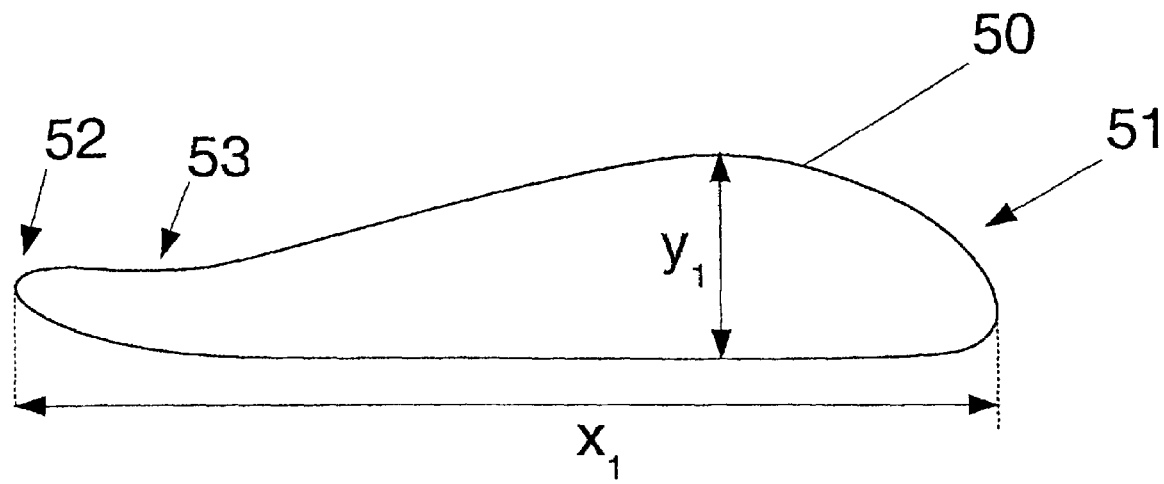
FIG. 5 is a schematic view of a first profile contour.

FIG. 5 is a preferred embodiment of a profile contour for a frame leg, whose profile depth $x_1$ is especially between 100 mm and 20 mm, preferably between 70 mm and 20 mm and most preferably between 25 mm and 50 mm.

The profile thickness $y_1$ of the frame leg is especially between 20 mm and 2 mm, preferably between 15 mm and 3 mm and most preferably between 10 mm and 5 mm.

In a view according to FIG. 5, profile contour 50 is indicated by a front region 51 which to the left end of the profile view includes a change point 53 which ends in region 52 of the profile contour.

Figure 6:
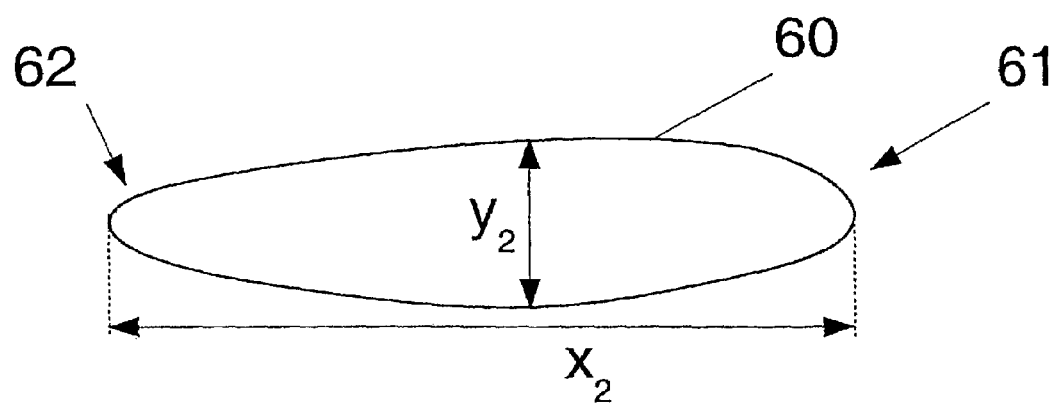
FIG. 6 is a schematic view of a second profile contour.

FIG. 6 shows a second profile contour of a frame leg according to the present invention, whose profile depth $x_2$ is between 100 mm and 10 mm, preferably between 70 mm and 15 mm, and most preferably between 50 mm and 25 mm.

The profile thickness $y_2$ of such a profile according to the invention is between 20 mm and 1 mm, preferably between 15 mm and 3 mm, and most preferably between 10 mm and 5 mm.

Figure 7:
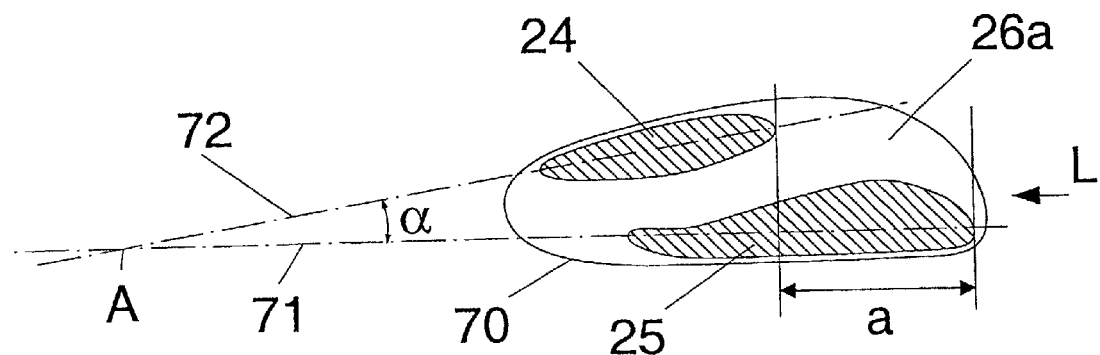
FIG. 7 is a schematic sectional view of a connection region along line A from FIG. 2.

FIG. 7 shows a sectional view of a fork brace 23 along the line A from FIG. 2. Beside the connection element 26a, the frame legs 24 and 25 are shown in a sectional view. Two chords 71 and 72 of the frame legs 24 and 25 intersect each other at a point A and, according to the present invention, form an angle between 0.5° and 10°, preferably between 0.7° and 7° and very preferably between 1° and 5°.

The distance a between the two front edges of the frame legs 24 and 25, according to the present invention is between 5 mm and 50 mm, preferably between 10 mm and 40 mm and most preferably between 5 mm and 35 mm.

The generating curve of an envelope 70 according to the present invention comprises a profile depth between 100 mm and 20 mm, preferably between 80 mm and 35 mm and most preferably between 65 mm and 40 mm.

The profile thickness of the generating curve of an envelope 70 according to the present invention is between 5 mm and 50 mm, preferably between 10 mm and 35 mm and very preferably between 15 mm and 25 mm.

According to the present invention, the preferred flow direction of the air is indicated by the arrow L. According to FIG. 7, the air flow during operation hits from the right side on the fork brace and flows around the same along the frame legs 24 and 25.

Figure 8:
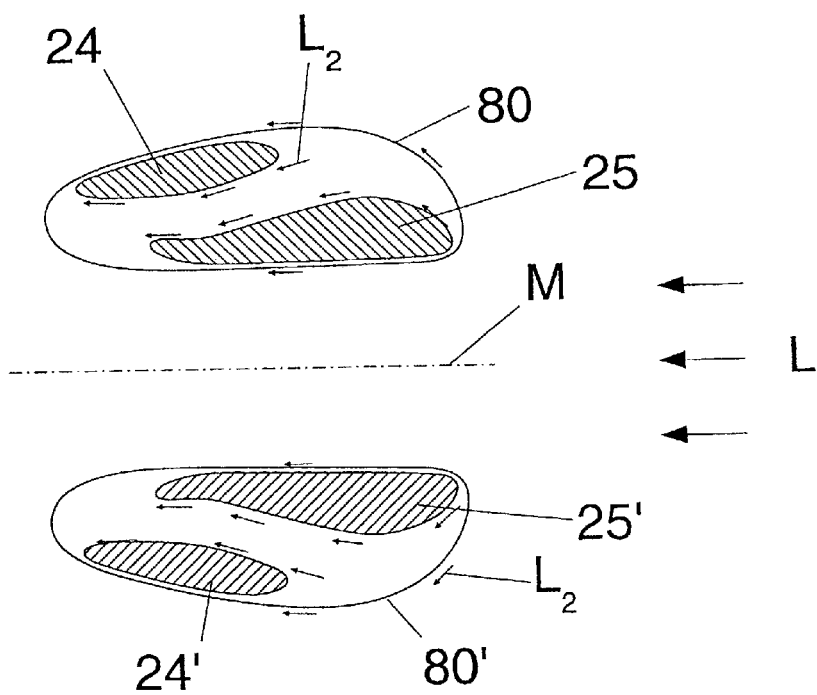
FIG. 8 is a schematic cross-sectional view of a bicycle fork from FIG. 1.

FIG. 8 shows a further sectional view of the fork braces 3a and 3b. Apart from the generating curves of an envelope 80 and 80', the figure shows the two frame legs 25 and 24, and 25' and 24'. The "air stream" of the frame legs substantially takes place along the arrow direction L, wherein the air passes according to the arrows L2 along the surfaces of the generating curves of an envelope 80 and 80' in the region of the connection elements and along the surfaces 24 and 25, and 24' and 25', between the connection elements.

The air flow running between two frame legs is guided away from a wheel, especially a wheel rim which is arranged between the two fork braces on the center plane M.

The invention claimed is:

1. A fork for guiding a vehicle wheel, particularly the front wheel of a bicycle, comprising:
   at least one fork brace for engaging an axis of the wheel, the at least one fork brace extending at least partially in a direction substantially parallel to a rotational plane of the wheel;
   the at least one fork brace being substantially formed to define a flow channel comprising the shape of a frame quadrangle;
   the quadrangle comprising at least two frame legs arranged substantially parallel to each other and spaced apart from each other;
   the at least two frame legs being connected by three connection elements at a defined position with respect to each other in a way that, when viewed in a direction perpendicular to the rotational plane of the wheel, the at least two frame legs partially overlap each other, wherein the flow channel extends substantially along a flow direction of the air as the bicycle travels, the flow direction being substantially parallel to the rotational plane of the wheel; and
   said frame legs being at least partially formed as profile ledges each having a distinct profiled contour and configured for creating a reduced flow resistance with respect to said air flow through and around said flow channel.

2. The fork according to claim 1, wherein the at least one fork brace comprises two fork braces which are formed of at least two frame legs and are connected with each other by at least one fixing means.

3. The fork according to claim 2, wherein the at least one fixing means comprises a fork tube, by means of which the fork is connectable to a bicycle frame.

4. The fork according to claim 3, wherein the fork braces, the fixing means, the connection element and the connection means are made of a material selected from a group consisting of metals, synthetic material, natural materials, fiber glass, carbon, Kevlar, glass fiber, compound materials, polyester, epoxy resins, polymers, wood, latex, aluminum and titan.

5. The fork according to claim 1, wherein each at least one fork brace is arranged at a predetermined angle with respect to a vertical middle axis and said angle is between 45° and 10°.

6. The fork according to claim 1, wherein said profile contour is formed as an airfoil.

7. The fork according to claim 1, wherein the shape and the arrangement of the profile ledges is selected such that the air flowing around and/or through the frame quadrangle is guided to a predetermined direction.

8. The fork according to claim 1, wherein the profile ledges of the at least one fork brace and/or the connection elements comprise structured elements.

9. The fork according to claim 1, further including at least two fork braces, wherein at least the profile ledges and the connection elements are connected to each other and/or the fork braces are connected respectively to each other by a connection selected from the group consisting of plug connections, bolt connections, and soldered connections.

10. The fork according to claim 1, wherein the profile ledges and the arrangement of the profile ledges are selected such that the mechanical properties of the at least one fork brace are adapted to meet predetermined requirements.

11. The fork according to claim 10, wherein the mechanical properties are selected from a group of properties consisting of the flexural stiffness and strength, torsional stiffness and strength, flexibility, strain, pressure resistance and breaking strength.

12. The fork according to claim 1, wherein the at least two frame legs are at least partially spaced from each other in a direction transverse to the rotational plane of the wheel.

13. The fork according to claim 12 wherein a forward edge of a first of the at least two frame legs extends farther forward in the direction of travel of the bicycle of a forward edge of a second of the at least two frame legs.

14. The fork according to claim 1 wherein the profile ledges are arranged such that said air flow is directed away from the wheel.

15. A fork for guiding a vehicle wheel, particularly the front wheel of a bicycle, comprising:
   at least one fork brace for engaging an axis of the wheel, the at least one fork brace extending at least partially in a direction substantially parallel to a rotational plane of the wheel;

the at least one fork brace being substantially formed to define a flow channel comprising the shape of a frame quadrangle;

the quadrangle comprising at least two frame legs arranged substantially parallel to each other and spaced apart from each other;

the at least two frame legs being held by at least two connection elements at a defined position with respect to each other in a way that, when viewed in a direction perpendicular to the rotational plane of the wheel, the at least two frame legs only partially overlap each other, wherein the flow channel extends substantially along a flow direction of the air as the bicycle travels, the flow direction being substantially parallel to the rotational plane of the wheel; and said frame legs being at least partially formed as profile ledges having a profiled contour and configured for creating a reduced flow resistance with respect to said air flow through and around said flow channel.

* * * * *